United States Patent
Gwidt et al.

(10) Patent No.: US 11,686,264 B1
(45) Date of Patent: Jun. 27, 2023

(54) SCAVENGING FOR PARTICULATE FILTER REGENERATION

(71) Applicant: GM GLOBAL TECHNOLOGY OPERATIONS LLC, Detroit, MI (US)

(72) Inventors: J. Michael Gwidt, Brighton, MI (US); Daniel P. Himes, Detroit, MI (US)

(73) Assignee: GM GLOBAL TECHNOLOGY OPERATIONS, Detroit, MI (US)

( * ) Notice: Subject to any disclaimer, the term of this patent is extended or adjusted under 35 U.S.C. 154(b) by 0 days.

(21) Appl. No.: 17/822,172

(22) Filed: Aug. 25, 2022

(51) Int. Cl.
| | | |
|---|---|---|
| *F02D 41/02* | (2006.01) | |
| *F02D 41/14* | (2006.01) | |
| *F02D 41/00* | (2006.01) | |
| *F02D 13/02* | (2006.01) | |

(52) U.S. Cl.
CPC ....... *F02D 41/029* (2013.01); *F02D 13/0261* (2013.01); *F02D 41/0007* (2013.01); *F02D 41/1446* (2013.01); *F02D 41/1466* (2013.01)

(58) Field of Classification Search
CPC ............. F02D 41/029; F02D 41/0007; F02D 41/1446; F02D 41/0466; F02D 13/0261; F01N 3/023; F01N 3/035; F01N 3/021; F01N 3/0821; F01N 3/0231; F01N 9/00; F01N 9/002; F01N 11/00; F01N 11/002; F01N 13/009; F01N 2560/06; F01N 2900/1606; F01N 2900/14; F01N 2900/1611; F01N 2900/1406; F01N 2430/085; F01N 2550/04; F01N 2250/02; F01N 2250/14; F01N 2260/04; F01N 2410/04; Y02T 10/12; Y02T 10/40
See application file for complete search history.

(56) References Cited

U.S. PATENT DOCUMENTS

| | | | | |
|---|---|---|---|---|
| 6,826,905 | B2 * | 12/2004 | Gui | F02D 13/0207 60/285 |
| 11,156,176 | B2 * | 10/2021 | Ulrey | F01N 3/10 |
| 2011/0072794 | A1 * | 3/2011 | Van Nieuwstadt | F02P 5/1502 60/285 |
| 2011/0072795 | A1 * | 3/2011 | Kerns | F01N 3/0236 123/703 |
| 2011/0072803 | A1 * | 3/2011 | Van Nieuwstadt | F02B 37/00 60/287 |
| 2011/0072804 | A1 * | 3/2011 | Van Nieuwstadt | F02D 13/0261 60/287 |

* cited by examiner

*Primary Examiner* — Audrey B. Walter
*Assistant Examiner* — Dapinder Singh
(74) *Attorney, Agent, or Firm* — Lorenz & Kopf LLP

(57) ABSTRACT

In accordance with exemplary embodiments, methods and systems are provided for controlling particulate filter regeneration for a particulate filter of a drive system of a vehicle, including: obtaining sensor data pertaining to the drive system via one or more sensors of the vehicle; determining, via a processor of the vehicle, when particulate filter regeneration is warranted, using the sensor data; and providing particulate filter regeneration while performing scavenging with respect to the drive system, via instructions provided by the processor, when it is determined that particulate filter regeneration is warranted.

17 Claims, 3 Drawing Sheets

SCAVENGING FOR PARTICULATE FILTER REGENERATION

TECHNICAL FIELD

The technical field generally relates to vehicles and, more specifically, to methods and systems for controlling particulate filter regeneration for engines of vehicles.

BACKGROUND

Certain vehicles today have engines with turbochargers, that force air into the engine that provides for increased power for the engine. Such turbochargers may include particulate filters, which require regeneration from time to time due to soot buildup that is created by a combustion process of the turbocharger. However, existing techniques may not always provide optimal particulate filter regeneration in certain circumstances.

Accordingly, it is desirable to provide improved methods and systems for controlling particulate filter regeneration for vehicles, including vehicle engines with turbochargers. Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, a method is provided for controlling particulate filter regeneration for a particulate filter of a drive system of a vehicle, the method including: obtaining sensor data pertaining to the drive system via one or more sensors of the vehicle; determining, via a processor of the vehicle, when particulate filter regeneration is warranted, using the sensor data; and providing particulate filter regeneration while performing scavenging with respect to the drive system, via instructions provided by the processor, when it is determined that particulate filter regeneration is warranted.

Also in an exemplary embodiment: the step of obtaining the sensor data includes obtaining soot data as to a concentration of soot in the particulate filter, via one or more soot sensors of the vehicle; the step of determining when the particulate filter regeneration is warranted includes determining, via the processor, that the particulate filter regeneration is warranted when the concentration of soot in the particulate filter exceeds a predetermined threshold value; and the step of providing the particulate filter regeneration includes providing the particulate filter regeneration while performing the scavenging with respect to the drive system, via the instructions provided by the processor, when the concentration of soot in the particulate filter exceeds the predetermined threshold value.

Also in an exemplary embodiment: the step of obtaining the sensor data further includes obtaining temperature data as to an exhaust temperature of the drive system, via one or more temperature sensors of the vehicle; and the method further includes increasing an intensity of the scavenging while the particulate filter regeneration is performed, provided that the exhaust temperature is less than a predetermined threshold.

Also in an exemplary embodiment, the method further includes terminating the particulate filter regeneration and scavenging with respect to the drive system, via the instructions provided by the processor, when the concentration of soot in the particulate filter is less than the predetermined threshold value.

Also in an exemplary embodiment, the particulate filter regeneration and scavenging are performed with respect to a turbocharger of the drive system, the turbocharger having the particulate filter and further including an intake valve and an exhaust valve, and the scavenging is performed by selectively moving the intake valve and the exhaust valve to generate a valve overlap therebetween.

Also in an exemplary embodiment, the scavenging is performed by opening the intake valve and the exhaust valve together, generating the valve overlap for a predetermined amount of time while heating the particulate filter is heated, in accordance with the instructions provided by the processor.

Also in an exemplary embodiment: the step of obtaining the sensor data includes obtaining temperature data as to an exhaust temperature of the drive system, via one or more temperature sensors of the vehicle; and the method further includes adjusting the predetermined amount of time for the valve overlap based on the exhaust temperature.

In another exemplary embodiment, a system is provided for controlling particulate filter regeneration for a particulate filter of a drive system of a vehicle, the system including: one or more sensors configured to obtain sensor data pertaining to the drive system; and a processor that is coupled to the one or more sensors and that is configured to at least facilitate: determining particulate filter regeneration is warranted, using the sensor data; and providing particulate filter regeneration while performing scavenging with respect to the drive system, via instructions provided by the processor, when it is determined that particulate filter regeneration is warranted.

Also in an exemplary embodiment: the one or more sensors include one or more soot sensors that are configured to obtain soot data as to a concentration of soot in the particulate filter; and the processor is further to configured to at least facilitate: determining that the particulate filter regeneration is warranted when the concentration of soot in the particulate filter exceeds a predetermined threshold value; and providing the particulate filter regeneration while performing the scavenging with respect to the drive system, via the instructions provided by the processor, when the concentration of soot in the particulate filter exceeds the predetermined threshold value.

Also in an exemplary embodiment: the one or more sensors further include one or more temperature sensors that are configured to obtain temperature data as to an exhaust temperature of the drive system; and the processor is further configured to at least facilitate increasing an intensity of the scavenging while the particulate filter regeneration is performed, provided that the exhaust temperature is less than a predetermined threshold.

Also in an exemplary embodiment, the processor is further configured to at least facilitate terminating the particulate filter regeneration and scavenging with respect to the drive system, via the instructions provided by the processor, when the concentration of soot in the particulate filter is less than the predetermined threshold value.

Also in an exemplary embodiment, the particulate filter regeneration and scavenging are performed with respect to a turbocharger of the drive system, the turbocharger having the particulate filter and further including an intake valve and an exhaust valve, and the scavenging is performed by selectively moving the intake valve and the exhaust valve to generate a valve overlap therebetween.

Also in an exemplary embodiment, the scavenging is performed by opening the intake valve and the exhaust valve together, generating the valve overlap for a predetermined amount of time while heating the particulate filter is heated, in accordance with the instructions provided by the processor.

Also in an exemplary embodiment: the one or more sensors include one or more temperature sensors that are configured to obtain temperature data as to an exhaust temperature of the drive system; and the processor is further configured to at least facilitate adjusting the predetermined amount of time for the valve overlap based on the exhaust temperature.

In another exemplary embodiment, a vehicle is provided that includes: a body; a drive system configured to generate movement of the body, the drive system including a particulate filter; one or more sensors configured to obtain sensor data pertaining to the drive system; and a processor that is coupled to the one or more sensors and that is configured to at least facilitate: determining particulate filter regeneration is warranted, using the sensor data; and providing particulate filter regeneration while performing scavenging with respect to the drive system, via instructions provided by the processor, when it is determined that particulate filter regeneration is warranted.

Also in an exemplary embodiment: the one or more sensors include one or more soot sensors that are configured to obtain soot data as to a concentration of soot in the particulate filter; and the processor is further to configured to at least facilitate: determining that the particulate filter regeneration is warranted when the concentration of soot in the particulate filter exceeds a predetermined threshold value; providing the particulate filter regeneration while performing the scavenging with respect to the drive system, via the instructions provided by the processor, when the concentration of soot in the particulate filter exceeds the predetermined threshold value; and terminating the particulate filter regeneration and scavenging with respect to the drive system, via the instructions provided by the processor, when the concentration of soot in the particulate filter is less than the predetermined threshold value.

Also in an exemplary embodiment: the one or more sensors further include one or more temperature sensors that are configured to obtain temperature data as to an exhaust temperature of the drive system; and the processor is further configured to at least facilitate increasing an intensity of the scavenging while the particulate filter regeneration is performed, provided that the exhaust temperature is less than a predetermined threshold.

Also in an exemplary embodiment: the drive system includes a turbocharger, the turbocharger having the particulate filter and further including an intake valve and an exhaust valve; and the scavenging is performed by selectively moving the intake valve and the exhaust valve to generate a valve overlap therebetween.

Also in an exemplary embodiment, the scavenging is performed by opening the intake valve and the exhaust valve together, generating the valve overlap for a predetermined amount of time while heating the particulate filter is heated, in accordance with the instructions provided by the processor.

Also in an exemplary embodiment: the one or more sensors include one or more temperature sensors that are configured to obtain temperature data as to an exhaust temperature of the drive system; and the processor is further configured to at least facilitate adjusting the predetermined amount of time for the valve overlap based on the exhaust temperature.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
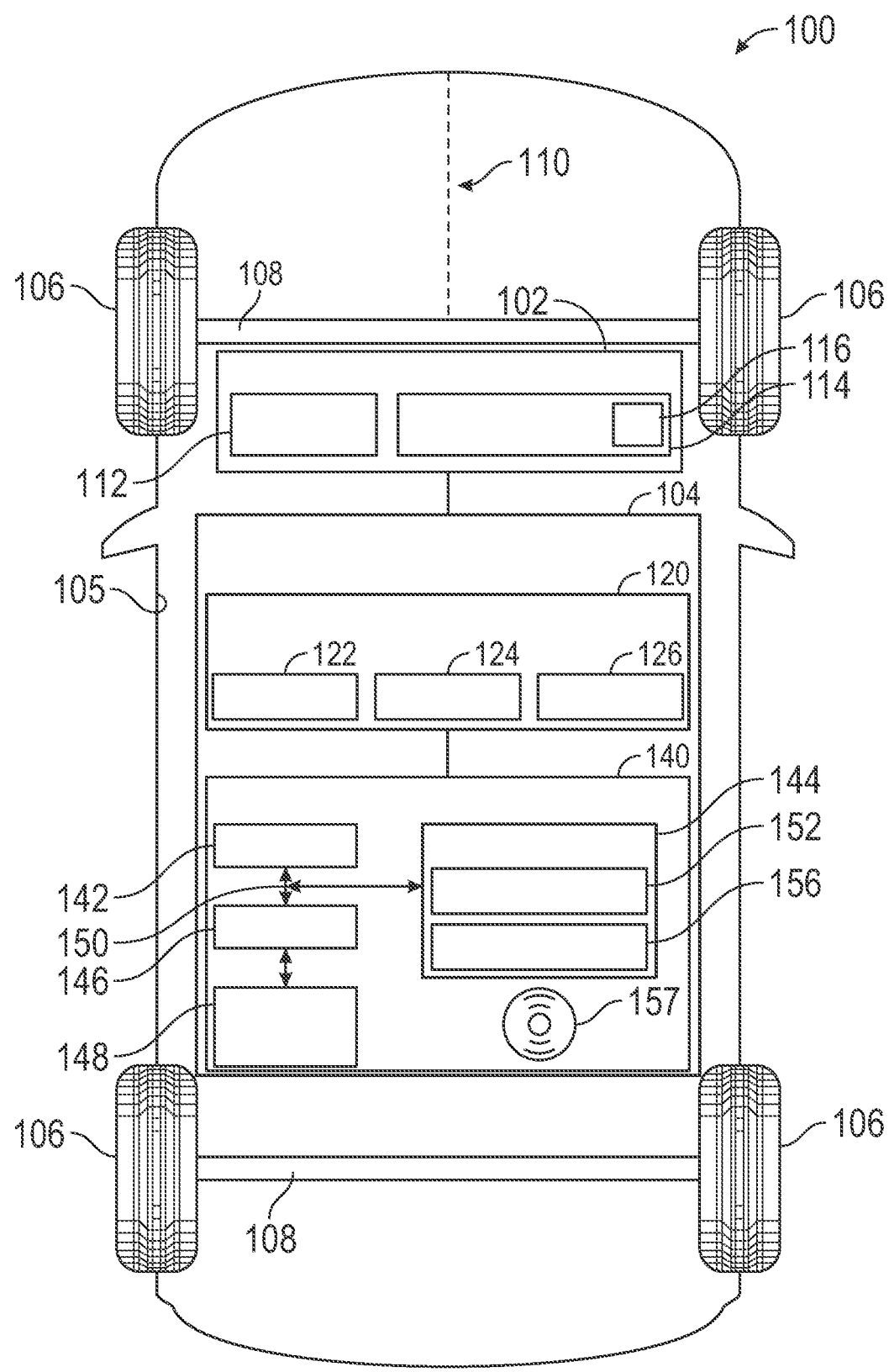
FIG. 1 is a functional block diagram of a vehicle having a drive system having an engine with a turbocharger that includes a particulate filter, and a having a control system for controlling particulate filter of the turbocharger using scavenging, in accordance with exemplary embodiments.

FIG. 1 illustrates a vehicle 100. In various embodiments, and as described in greater detail below, the vehicle 100 includes a drive system 102 and a control system 104. Also as described below in accordance with various embodiments, the drive system 102 includes an engine 112 and a turbocharger 114 having a particulate filter 116, and the control system 104 controls particulate filter regeneration of the particulate filter 116 via scavenging with respect to the turbocharger 114 (for example as described in greater detail further below in connection with the vehicle 100 of FIG. 1, the drive system of FIGS. 1 and 2, and the process 300 of FIG. 3 in accordance with various embodiments).

In various embodiments, the vehicle 100 comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

As depicted in FIG. 1, the vehicle 100 includes a body 105 that is arranged on a chassis 110. The body 105 substantially encloses other components of the vehicle 100. The body 105 and the chassis 110 may jointly form a frame. The vehicle 100 also includes a plurality of wheels 106 and axles 108 coupled thereto. The wheels 106 are each rotationally coupled to the chassis 110 near a respective corner of the body 105 to facilitate movement of the vehicle 100. In one embodiment, the vehicle 100 includes four wheels 106, although this may vary in other embodiments (for example for trucks and certain other vehicles).

In various embodiments, the drive system 102 is mounted on the chassis 110, and drives the wheels 106 via the axles 108. In the depicted embodiment, the drive system comprises a propulsion system that includes an engine 112. In various embodiments, the drive system 102 includes an internal combustion engine 112 along with a turbocharger 114. In various embodiments, the turbocharger 114 forces air into the engine 112, thereby generating additional power for the engine 112. Also in various embodiments, the turbocharger 114 includes a particulate filter 116 for filtering of soot generated by combustion of the engine 112. internal combustion engines.

Figure 2:
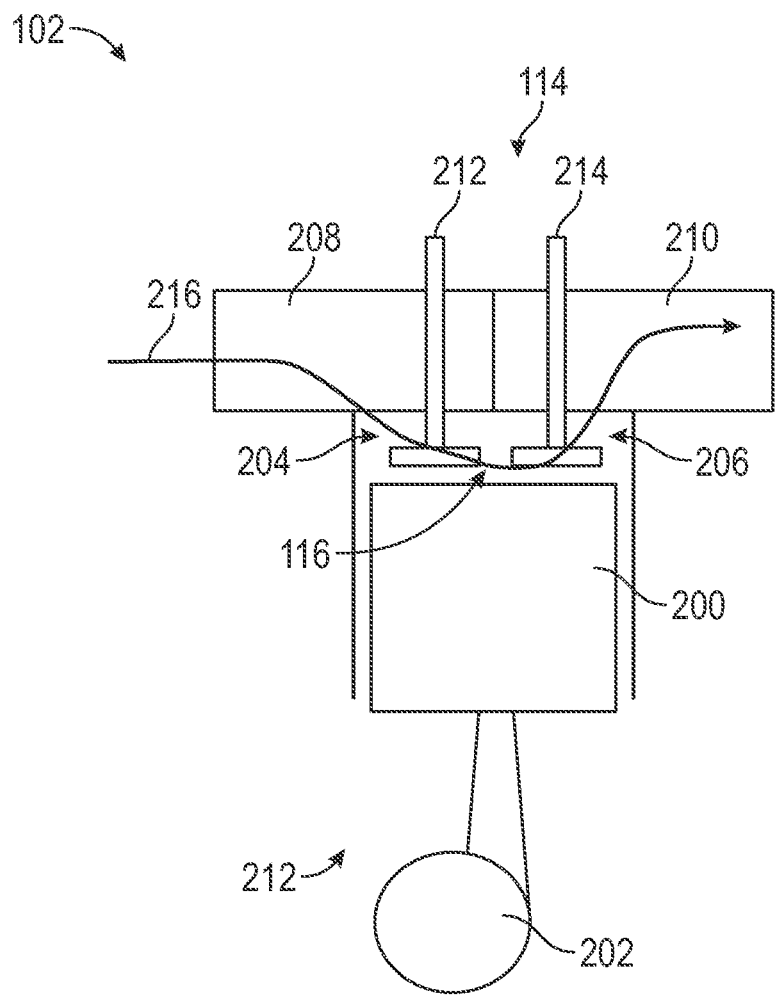
FIG. 2 is a functional block diagram of part of the drive system of FIG. 1, including components of the engine and turbocharger thereof, and that can be implemented in connection with the vehicle of FIG. 1, in accordance with exemplary embodiments.

With reference to FIG. 2, an illustration is provided for a portion of the drive system 102 of FIG. 1, including a simplified illustration of the engine 112, the turbocharger 114, and the particulate filter 116. As depicted in FIG. 2, in various embodiments, the engine 112 includes a cylinder 200 and an actuator 202. In various embodiments, combustion occurs within the cylinder 200, and the actuator 202 is utilized for powering the vehicle 100 (e.g., including the axles 108 and wheels 106 thereof) via power generated by the combustion.

With continued reference to FIG. 2, and also in accordance with various embodiments, the turbocharger 114 includes the particulate filter 116 of FIG. 1 as well as an inlet 204, an outlet 206, an intake valve 212, and an exhaust valve 214. In various embodiments, the intake valve 212 controls the flow of intake air 208 into the cylinder 200. Also in various embodiments, the exhaust valve 214 controls the flow of exhaust air 210 out of the cylinder 200. It will be appreciated that as the air flows into and out of the cylinder 200 via an exemplary flow path 216 as illustrated in FIG. 2, the air moves through a compressor and turbine (not depicted in FIG. 2) as the air enters and exits the cylinder 200, respectively.

In addition, as depicted in FIG. 2, as the air travels through the flow path 216, the air is filtered by the particulate filter 116. In various embodiments, the particulate filter 116 removes soot from the air resulting from combustion in the cylinder 200. Also in various embodiments, the particulate filter 116 may be regenerated via selectively while an overlap condition is generated for the simultaneous opening of the intake valve 212 and the exhaust valve 214, as described in greater detail below.

With reference back to FIG. 1, in various embodiments the control system 104 controls regeneration for the particulate filter 116 by providing instructions for the selective movement and control of the intake valve 212 and the exhaust valve 214 in performing scavenging in certain circumstances, for example as described greater below in connection with the process 300 of FIG. 3. Also in various embodiments, the control system 104 may also provide various other control functionality for the drive system 102 and/or for various other systems and components of the vehicle 100.

With continued reference to FIG. 1, in various embodiments the control system 104 is coupled to the drive system 102, and includes a sensor array 120 and a controller 140.

In various embodiments, the sensor array 120 includes sensors that obtain sensor data pertaining to the drive system 102 and for use in controlling the drive system 102, including the regeneration for the particulate filter 116 thereof. In the depicted embodiment, the sensor array 120 includes one or more soot sensors 122 and temperature sensors 124. It will be appreciated that in certain embodiments the sensor array 120 may also contain any number of other sensors 126.

In various embodiments, the soot sensors 122 detect a presence, amount, and/or concentration of soot in the particulate filter 116. As used herein throughout this Application, the term "soot" is used to refer to any particles or matter generated by the combustion of the engine 112, including without limitation powdery, flaky, or other carbon substances generated by the combustion. In certain embodiments, the soot sensors 122 may comprise one or more pressure sensors, such as a differential pressure sensor. However, this may vary in other embodiments, for example in that one or more other sensors may also be utilized in certain embodiments.

In various embodiments, the temperature sensors 124 are configured to measure air temperature of one or more portions of the air of the drive system 102. In various embodiments, the temperature sensors 124 are utilized to measure a temperature of exhaust air 210 of FIG. 2 as it exits the turbocharger 114 via the outlet 206.

In certain embodiments, the sensor array 120 may also include one or more additional types of sensors 126, such as by way of example one or more engine torque sensors, among other different possible types of sensors.

In various embodiments, the controller 140 is coupled to the sensor array 120. In various embodiments, the controller 140 is also coupled to the drive system 102, including the turbocharger 114 thereof. In various embodiments, the controller 140 may also be coupled to one or more other systems and/or components of the vehicle 100.

As depicted in FIG. 1, in various embodiments the controller 140 comprises a computer system (also referred to herein as computer system 140), and includes a processor 142, a memory 144, an interface 146, a storage device 148, and a computer bus 150. In various embodiments, the controller (or computer system) 140 controls regenerative filtering of the particulate filter 116. In various embodiments, the controller 140 controls various other functions of the vehicle 100, including movement of the vehicle 100 and various other functions of the drive system 102 and various other vehicle systems and components. In various embodiments, the controller 140 provides these and other functions in accordance with the steps of the process 300 of FIG. 3 and as described further below in connection therewith.

In various embodiments, the controller 140 (and, in certain embodiments, the control system 104 itself) is disposed within the body 105 of the vehicle 100. In one embodiment, the control system 104 is mounted on the chassis 110. In certain embodiments, the controller 140 and/or control system 104 and/or one or more components thereof may be disposed outside the body 105, for example on a remote server, in the cloud, or other device where image processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the process 300 of FIG. 3 and as described further below in connection therewith.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with one or more stored values 156 (e.g., threshold values for controlling particulate filter regeneration).

The bus 150 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of the process 300 of FIG. 3 and as described further below in connection therewith. In another exemplary embodiment, the program product may be directly stored in and/or otherwise accessed by the memory 144 and/or a disk (e.g., disk 157), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

Figure 3:
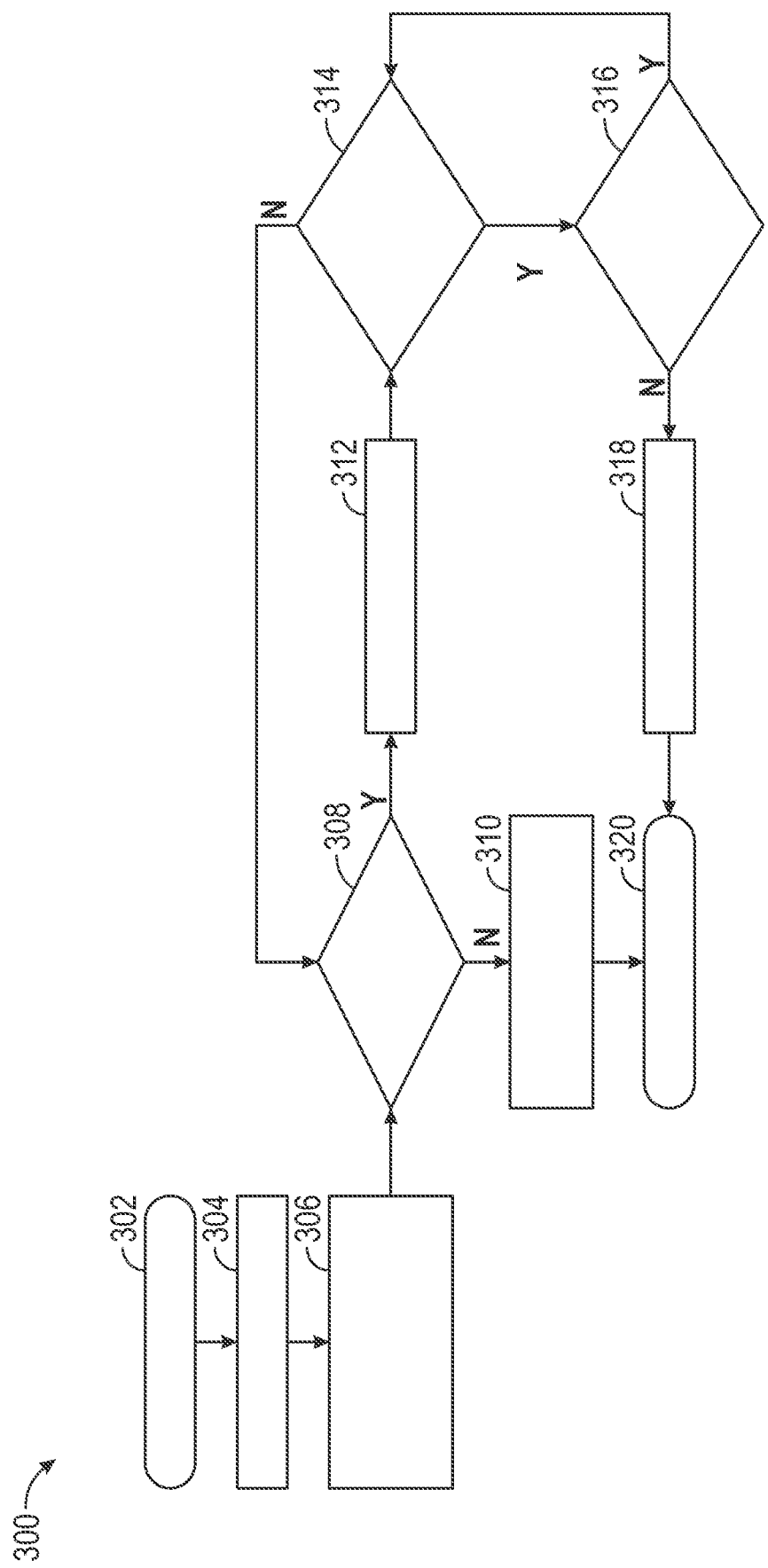
FIG. 3 depicts a flowchart of a process for controlling particulate filter regeneration for vehicles, including vehicle engines with turbochargers, and that can be utilized in connection with the vehicle of FIG. 1, including the drive system of FIGS. 1 and 2 and the control system of FIG. 1, in accordance with exemplary embodiments.

With reference to FIG. 3, a flowchart is provided of a process 300 for particulate filter regeneration using scavenging, in accordance with exemplary embodiments. In various embodiments, the process 300 can be implemented in connection with the vehicle 100 of FIG. 1, including the drive system 102 of FIGS. 1 and 2, the control system 104 of FIG. 1, and components thereof.

As depicted in FIG. 3, the process 300 begins at step 302. In one embodiment, the process 300 begins when a vehicle drive or ignition cycle begins, for example when a driver or other user approaches or enters the vehicle 100, when the driver or other user turns on the vehicle and/or an ignition therefor (e.g. by turning a key, engaging a keyfob or start button, and so on), or when the vehicle begins operation. In one embodiment, the steps of the process 300 are performed continuously during operation of the vehicle.

In various embodiments, sensor data is obtained (step 304). In various embodiments, sensor data is obtained with respect to the operation of the drive system 102 of FIGS. 1 and 2. In various embodiments, the sensor data is obtained via sensors of the sensor array 120 of FIG. 1 and are provided to the processor 142 of FIG. 1 for processing.

Specifically, in various embodiments, the sensor data of step 304 includes soot detection data as to the presence and amount of soot (e.g., an estimated volume, mass, and/or percentage concentration thereof) in the particulate filter 116 of FIGS. 1 and 2. In various embodiments, the soot data is obtained via one or soot sensors 122 of FIG. 1, such as via one or more differential pressure sensors and/or one or more other types of soot detection sensors, and provided to the processor 142 of FIG. 1 for processing.

Also in various embodiments, the sensor data of step 304 further includes temperature data as to one or more temperatures of air along the flow path 216 of FIG. 2. In various embodiments, the temperature data includes a temperature of exhaust air 210 of FIG. 2 as it exits the turbocharger 114 via the outlet 206, as measured via one or more temperature sensors 124 of FIG. 1, and provided to the processor 142 of FIG. 1 for processing.

In various embodiments, the sensor data of step 304 (including the soot data and the temperature data) is collected and utilized continuously throughout the process 300.

Also in various embodiments, particulate filter regeneration is requested (step 306). In various embodiments, particulate filter regeneration is requested in accordance with instructions provided by the processor 142 of FIG. 1 when a concentration of soot in the particulate filter 116 of FIGS. 1 and 2 exceeds a predetermined threshold (e.g., that is stored in the memory 144 as a stored value 156 thereof), or, alternatively stated, when particulate filter regeneration is warranted.

In various embodiments, once it is determined that particulate filter regeneration is requested (e.g., warranted), a determination is whether scavenging is available (step 308). In certain embodiments, the processor 142 of FIG. 1 makes this determination based at least in part on the sensor data of step 304, as well as the current state of operation of the drive system 102 of FIGS. 1 and 2. In certain embodiments, the processor 142 determines that scavenging is available when the intake valve 212 and the exhaust valve 214 are ready for selective movement as directed by the processor 142 for scavenging, and provided that there is sufficient intake air 208 of FIG. 2 available for scavenging, among other possible conditions in various embodiments.

In various embodiments, if it is determined in step 310 that scavenging is not available, then traditional particulate filter regeneration is performed (step 310). Specifically, in various embodiments, during step 310, the processor 142 of FIG. 1 provides instructions for the heating of the particulate filter 116 of FIGS. 1 and 2. In various embodiments, the particulate filter 116 is heated to a predetermined temperature (e.g., stored in the memory 144 of FIG. 1 as a stored value 156 thereof) in order to provide regeneration for the particulate filter 116 (e.g., including burning off of soot in the particulate filter 116). In various embodiments, during step 310, scavenging is not performed as part of the regeneration, and the intake valve 212 and the exhaust valve 214 are not commanded to new positions. In certain embodiments, during step 310, the intake valve 212 and the exhaust valve 214 both remain closed.

In various embodiments, following step 310, the process 300 then terminates (step 320). Specifically, in various embodiments, during step 320, the process 300 terminates via an exit function (e.g., stored in the memory 144 of FIG. 1) in accordance with instructions provided by the processor 142 of FIG. 1.

Conversely, with reference back to step 310 in various embodiments, if it is instead determined in step 310 that scavenging is available, then a scavenging intensity is increased (step 312). As used throughout this Application, the scavenging intensity (or "SI") refers to a magnitude of scavenging that is performed for the drive system 102 in accordance with instructions provided by the processor 142 of FIG. 1. In various embodiments, scavenging is performed as the intake valve 212 and the exhaust valve 214 of FIG. 2 are both left open at the same time (in accordance with instructions provided by the processor 142), such that the intake air 208 of FIG. 2 mixes with the exhaust air 210 of FIG. 2.

In various embodiments, the scavenging intensity (or "SI") refers specifically to the magnitude by which the intake valve 212 and the exhaust valve 214 are open at the same time (i.e., the magnitude of a valve overlap between the intake valve 212 and the exhaust valve 214, during which both valves are left open), thereby also affecting the magnitude by which the intake air 208 mixes with the exhaust air 210. In certain embodiments, changes in the magnitude of the scavenging corresponding to changes in the scavenging intensity ("SI") are accomplished by adjusting the amount of time in which the intake valve 212 and the exhaust valve 214 are both simultaneously left opened (i.e., by adjusting the duration of the valve overlap).

In certain embodiments, the value of the scavenging intensity ("SI") may reflect a percentage of the maximum allowed scavenging for the drive system 102 for the vehicle 100 (e.g., as saved in the memory 144 of FIG. 1 as one of the stored values 156 thereof). For example, in certain embodiments: a scavenging value of "0" refers to no scavenging; whereas a scavenging value of "1" represents maximum scavenging; and a scavenging value of "0.1" represents ten percent (10%) of the maximum scavenging, and so on.

In addition, in certain embodiments, during step 312, the scavenging intensity ("SI") value is increased by 0.1, referring to an increase in scavenging intensity equal to ten percent (10%) of the maximum scavenging. However, this amount may vary in other embodiments. Also in various embodiments, the increase in the scavenging intensity (SI) during step 312 is accomplished by the selective opening of both the intake valve 212 and the exhaust valve 214 of FIG. 2 in an amount (and/or for a duration of time) sufficient to accomplish the desired increased in the scavenging intensity (SI) value, as the particulate filter 116 is heated for regeneration, in accordance with instructions provided by the processor 142 of FIG. 1.

In various embodiments, during step 312, scavenging and particulate filter regeneration are performed utilizing the increased scavenging intensity (SI) of step 312 (including the selective opening of both the intake valve 212 and the exhaust valve 214 while the particulate filter 116 is heated). In various embodiments, the particulate filter 116 regenerates due to the increased temperature, and the soot loading is reduced while the scavenging is performed. Specifically, in various embodiments, when the exhaust valve 214 closes fresh air has passed from the intake to exhaust for scavenging, and the air fuel ratio in the cylinder 200 will be relatively rich (e.g., with an increase in air as a function of fuel) during scavenging. In various embodiments, as a result, during the exhaust event the excess fuel will react with the fresh air passed to the exhaust during scavenging, and the exothermal reaction will increase the exhaust gas temperature and facilitate the particulate filter regeneration.

In various embodiments, following step 312, a determination is made as to whether the exhaust temperature has exceeded a predetermined value (step 314). In various embodiments, this determination is made based on the temperature values of the exhaust air 210 of FIG. 2 as measured via the sensor data of step 304. In various embodiments, a determination is made by the processor 142 of FIG. 1 as to whether the exhaust air 210 exceeds a predetermined target temperate as stored in the memory 144 as one of the stored values 156 thereof. In certain embodiments, the target temperature comprises a maximum temperature for scavenging for the particular drive system 102 and vehicle 100.

In various embodiments, if it is determined in step 314 that the temperature (e.g., the temperature of the exhaust air 210) has not exceeded the predetermined value (e.g., the target temperature), then the process returns to step 308. In various embodiments, steps 308-314 thereafter repeat in new iterations (e.g., by continued particulate filter regeneration and scavenging using updated sensor data and further increases in the scavenging intensity (SI) in new iterations of step 312 as appropriate) until a determination is made during an iteration of step 314 that the exhaust temperature has exceeded the predetermined threshold.

In various embodiments, once it is determined during an iteration of step 314 that the temperature (e.g., of the exhaust air 210) has exceeded the predetermined value, then the process proceeds to step 316. In various embodiments, during step 316, a determination is made as to whether regeneration has been accomplished. Specifically, in various embodiments, during step 316, a determination is made as to whether a current concentration of soot in the particulate filter 116 is now less than a predetermined threshold (e.g., that is stored in the memory 144 as a stored value 156 thereof). In certain embodiments, this determination is made by the processor 142 using the sensor data (including the soot data) of step 304. Also in certain embodiments, the same threshold value for soot concentration form step 306 is also utilized for the threshold value during step 316; however, this may vary in certain other embodiments.

In various embodiments, if it is determined in step 316 that the regeneration has not yet been accomplished, then the process returns to step 314. In various embodiments, regeneration of the particulate filter 116 continues to be performed using scavenging (as described above) as new iterations of steps 308-314 are performed, until it is determined during an iteration of step 316 that the regeneration has been accomplished.

Conversely, in various embodiments, once it is determined during an iteration of step 316 that the regeneration has been accomplished, then the regeneration of the particulate filter is complete. Specifically, in various embodiments, the scavenging intensity (SI) is set equal to zero, and the scavenging is terminated. In various embodiments, this is accomplished in accordance with instructions provided by the processor 142 in closing the intake valve 212 and the exhaust valve 214 of FIG. 2.

In various embodiments, the process then terminates at step 320. Specifically, as noted above, in various embodiments during step 320 the process 300 terminates via an exit function (e.g., stored in the memory 144 of FIG. 1) in accordance with instructions provided by the processor 142 of FIG. 1.

Accordingly, methods, systems, and vehicles are provided for controlling regeneration for the particulate filter 116. In various embodiments, as discussed above in connection with the process 300 of FIG. 3, scavenging is performed during particulate filter regeneration as the particulate filter 116 is heated. Specifically, in various embodiments, the intake valve 212 and the exhaust valve 214 are simultaneously opened during the particulate filter regeneration (as the particulate filter 116 is heated). As a result, excess fuel will react with the fresh air in the exhaust. As described above, if the exhaust temperature is not at a sufficient target temperature threshold, the scavenging intensity (SI) is increased as part of the process 300, which thereby increases the scavenging and the richness of the air.

In various embodiments, the particulate filter 116 regenerates due to the increased temperature, and the soot loading is reduced while the scavenging is performed. Specifically, in various embodiments, when the exhaust valve 214 closes fresh air has passed from the intake to exhaust for scavenging, and the air fuel ratio in the cylinder 200 will be relatively rich (e.g., with an increase in air as a function of fuel) during scavenging. In various embodiments, as a result, during the exhaust event the excess fuel will react with the fresh air passed to the exhaust during scavenging, and the exothermal reaction will increase the exhaust gas temperature. In various embodiments, the increased exhaust gas temperature will promote particulate filter regeneration while keeping engine torque optimized. Also in various embodiments, the scavenging is performed until the soot concentration is sufficiently low, such that further regeneration is not needed.

In various embodiments, the techniques disclosed herein (including the steps and functions of the process 300 of FIG. 3 and as described above) provides for expanded conditions in which scavenging and particulate filter regeneration are performed. In various embodiments, this may result in cleaner air for the exhaust air, and/or other improved performance for the drive system 102 and/or for the vehicle 100.

It will be appreciated that the systems, vehicles, and methods may vary from those depicted in the Figures and described herein. For example, the vehicle 100 of FIG. 1, the drive system 102 of FIGS. 1 and 2, the control system 104 of FIG. 1, and/or the components thereof may differ from that depicted in FIG. 1. It will similarly be appreciated that the steps of the process 300 may differ from those depicted in FIG. 3, and/or that various steps of the process 300 may occur concurrently and/or in a different order than that depicted in FIG. 3.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling particulate filter regeneration for a particulate filter of a drive system of a vehicle, the drive system having an intake valve and an exhaust valve, the method comprising:
    obtaining sensor data pertaining to the drive system via one or more sensors of the vehicle, including obtaining temperature sensor data as to an exhaust temperature of the drive system;
    determining, via a processor of the vehicle, when particulate filter regeneration is warranted, using the sensor data; and
    providing particulate filter regeneration while performing scavenging with respect to the drive system, via instructions provided by the processor, when it is determined that particulate filter regeneration is warranted, and wherein the scavenging is performed by simultaneous opening of both the intake valve and the exhaust valve for a varying predetermined amount of time that is sequentially increased over time during operation of the drive system provided that the exhaust temperature is less than a predetermined threshold, and wherein the scavenging continues without further sequential increases once the exhaust temperature is greater than the predetermined threshold and until the particulate filter regeneration is no longer warranted.

2. The method of claim 1, wherein:
    the step of obtaining the sensor data further comprises obtaining soot data as to a concentration of soot in the particulate filter, via one or more soot sensors of the vehicle;
    the step of determining when the particulate filter regeneration is warranted comprises determining, via the processor, that the particulate filter regeneration is warranted when the concentration of soot in the particulate filter exceeds a predetermined threshold value; and
    the step of providing the particulate filter regeneration further comprises providing the particulate filter regeneration while performing the scavenging with respect to the drive system, via the instructions provided by the processor, when the concentration of soot in the particulate filter exceeds the predetermined threshold value.

3. The method of claim 2, wherein:
    the method further comprises increasing an intensity of the scavenging while the particulate filter regeneration is performed, provided that the exhaust temperature is less than a predetermined threshold.

4. The method of claim 1, further comprising:
terminating the particulate filter regeneration and scavenging with respect to the drive system, via the instructions provided by the processor, when the concentration of soot in the particulate filter is less than the predetermined threshold value.

5. The method of claim 1, wherein the particulate filter regeneration and scavenging are performed with respect to a turbocharger of the drive system.

6. The method of claim 5, wherein the scavenging is performed by opening the intake valve and the exhaust valve together, generating valve overlap for a predetermined amount of time while heating the particulate filter is heated, in accordance with the instructions provided by the processor.

7. A system for controlling particulate filter regeneration for a particulate filter of a drive system of a vehicle, the drive system having an intake valve and an exhaust valve, the system comprising:
one or more sensors configured to obtain sensor data pertaining to the drive system, including one or more temperature sensors configured to obtain temperature sensor data as to an exhaust temperature of the drive system; and
a processor that is coupled to the one or more sensors and that is configured to at least facilitate:
determining particulate filter regeneration is warranted, using the sensor data; and
providing particulate filter regeneration while performing scavenging with respect to the drive system, via instructions provided by the processor, when it is determined that particulate filter regeneration is warranted, and wherein the scavenging is performed by simultaneous opening of both the intake valve and the exhaust valve for a varying predetermined amount of time that is sequentially increased over time during operation of the drive system provided that the exhaust temperature is less than a predetermined threshold, and wherein the scavenging continues without further sequential increases once the exhaust temperature is greater than the predetermined threshold and until the particulate filter regeneration is no longer warranted.

8. The system of claim 7, wherein:
the one or more sensors further comprise one or more soot sensors that are configured to obtain soot data as to a concentration of soot in the particulate filter; and
the processor is further to configured to at least facilitate:
determining that the particulate filter regeneration is warranted when the concentration of soot in the particulate filter exceeds a predetermined threshold value; and
providing the particulate filter regeneration while performing the scavenging with respect to the drive system, via the instructions provided by the processor, when the concentration of soot in the particulate filter exceeds the predetermined threshold value.

9. The system of claim 8, wherein:
the processor is further configured to at least facilitate increasing an intensity of the scavenging while the particulate filter regeneration is performed, provided that the exhaust temperature is less than a predetermined threshold.

10. The system of claim 9, wherein the processor is further configured to at least facilitate terminating the particulate filter regeneration and scavenging with respect to the drive system, via the instructions provided by the processor, when the concentration of soot in the particulate filter is less than the predetermined threshold value.

11. The system of claim 7, wherein the particulate filter regeneration and scavenging are performed with respect to a turbocharger of the drive system.

12. The system of claim 11, wherein the scavenging is performed by opening the intake valve and the exhaust valve together, generating valve overlap for a predetermined amount of time while heating the particulate filter is heated, in accordance with the instructions provided by the processor.

13. A vehicle comprising:
a body;
a drive system configured to generate movement of the body, the drive system including a particulate filter, the drive system having an intake valve and an exhaust valve;
one or more sensors configured to obtain sensor data pertaining to the drive system, including one or more temperature sensors configured to obtain temperature sensor data as to an exhaust temperature of the drive system; and
a processor that is coupled to the one or more sensors and that is configured to at least facilitate:
determining particulate filter regeneration is warranted, using the sensor data; and
providing particulate filter regeneration while performing scavenging with respect to the drive system, via instructions provided by the processor, when it is determined that particulate filter regeneration is warranted, and wherein the scavenging is performed by simultaneous opening of both the intake valve and the exhaust valve for a varying predetermined amount of time that is sequentially increased over time during operation of the drive system provided that the exhaust temperature is less than a predetermined threshold, and wherein the scavenging continues without further sequential increases once the exhaust temperature is greater than the predetermined threshold and until the particulate filter regeneration is no longer warranted.

14. The vehicle of claim 13, wherein:
the one or more sensors further comprise one or more soot sensors that are configured to obtain soot data as to a concentration of soot in the particulate filter; and
the processor is further to configured to at least facilitate:
determining that the particulate filter regeneration is warranted when the concentration of soot in the particulate filter exceeds a predetermined threshold value;
providing the particulate filter regeneration while performing the scavenging with respect to the drive system, via the instructions provided by the processor, when the concentration of soot in the particulate filter exceeds the predetermined threshold value; and
terminating the particulate filter regeneration and scavenging with respect to the drive system, via the instructions provided by the processor, when the concentration of soot in the particulate filter is less than the predetermined threshold value.

15. The vehicle of claim 14, wherein:
the processor is further configured to at least facilitate increasing an intensity of the scavenging while the particulate filter regeneration is performed, provided that the exhaust temperature is less than a predetermined threshold.

16. The vehicle of claim 13, wherein:
the drive system comprises a turbocharger.

17. The vehicle of claim 16, wherein the scavenging is performed by opening the intake valve and the exhaust valve together, generating valve overlap for a predetermined amount of time while heating the particulate filter is heated, in accordance with the instructions provided by the processor.

\* \* \* \* \*